(12) United States Patent
Loyd et al.

(10) Patent No.: US 10,893,287 B2
(45) Date of Patent: Jan. 12, 2021

(54) GEOSPATIAL MEDIA RECORDING SYSTEM

(71) Applicant: Remote GeoSystems, Inc., Fort Collins, CO (US)

(72) Inventors: Bradon D. Loyd, Fort Collins, CO (US); Jeffrey W. Dahlke, Fort Collins, CO (US)

(73) Assignee: Remote Geosystems, Inc., Fort Collins, CO (US)

( * ) Notice: Subject to any disclaimer, the term of this patent is extended or adjusted under 35 U.S.C. 154(b) by 0 days.

(21) Appl. No.: 15/881,355

(22) Filed: Jan. 26, 2018

(65) Prior Publication Data

US 2018/0152720 A1    May 31, 2018

Related U.S. Application Data

(63) Continuation of application No. 14/622,861, filed on Feb. 14, 2015, now Pat. No. 9,936,214.

(51) Int. Cl.
| | |
|---|---|
| *H04N 19/46* | (2014.01) |
| *H04N 21/422* | (2011.01) |
| *H04N 21/45* | (2011.01) |
| *G10L 19/018* | (2013.01) |
| *H04N 19/44* | (2014.01) |
| *H04N 21/433* | (2011.01) |
| *G06F 16/29* | (2019.01) |

(52) U.S. Cl.
CPC ............. *H04N 19/46* (2014.11); *G06F 16/29* (2019.01); *G10L 19/018* (2013.01); *H04N 19/44* (2014.11); *H04N 21/422* (2013.01); *H04N 21/4334* (2013.01); *H04N 21/4524* (2013.01)

(58) Field of Classification Search
None
See application file for complete search history.

(56) References Cited

U.S. PATENT DOCUMENTS

| | | |
|---|---|---|
| 5,170,164 A | 12/1992 | Lewis |
| 6,061,793 A | 5/2000 | Tewfik et al. |
| | (Continued) | |

OTHER PUBLICATIONS

I-Cubed. Game, Website, www.i3.com, originally downloaded Sep. 2, 2014, 2 total pages.

(Continued)

*Primary Examiner* — Frederick D Bailey
(74) *Attorney, Agent, or Firm* — Craig R. Miles; CR Miles P.C.

(57) ABSTRACT

A computer implemented geospatial media recording system which receives a global positioning signal from a global positioning system, a video stream from a video recorder and an audio stream from an audio recorder and encodes the global positioning system signal as global positioning data continuously embedded at intervals in the video stream or the audio stream at a frequency at the upper end or outside of the human audible range as a combined data stream which by operation of a geospatial media program can be concurrently displayed as a video in a first display area with a geospatial representation in second display area on a display surface with a plurality of coordinate location indicators located in the geospatial representation each at the coordinate location associated with the global positioning data embedded in the video.

16 Claims, 9 Drawing Sheets

(56) References Cited

U.S. PATENT DOCUMENTS

| | | | |
|---|---|---|---|
| 6,091,816 | A | 7/2000 | Woo |
| 6,141,693 | A | 10/2000 | Perlman et al. |
| 6,931,660 | B1 | 8/2005 | Kalluri et al. |
| 7,239,311 | B2 | 7/2007 | Dunn et al. |
| 8,265,818 | B2 | 9/2012 | Allport |
| 8,666,219 | B2 | 3/2014 | Wright et al. |
| 8,687,841 | B2 | 4/2014 | Malone et al. |
| 2002/0044690 | A1 | 4/2002 | Burgess |
| 2003/0052910 | A1* | 3/2003 | Shiiyama ............ G11B 27/034 715/719 |
| 2003/0215110 | A1 | 11/2003 | Phoads et al. |
| 2005/0278371 | A1 | 12/2005 | Funk et al. |
| 2006/0056506 | A1 | 3/2006 | Ho et al. |
| 2007/0055441 | A1* | 3/2007 | Retterath ........... G01C 21/3647 701/532 |
| 2008/0082264 | A1 | 4/2008 | Hill et al. |
| 2009/0064241 | A1* | 3/2009 | Fellenstein .......... G11B 27/329 725/87 |
| 2009/0136211 | A1 | 5/2009 | Kikukawa et al. |
| 2009/0323802 | A1 | 12/2009 | Walters et al. |
| 2010/0104187 | A1 | 4/2010 | Broadbent |
| 2011/0038594 | A1 | 2/2011 | Symons et al. |
| 2011/0238503 | A1 | 9/2011 | Naini |
| 2012/0008693 | A1* | 1/2012 | Yao ................ H04N 21/234381 375/240.25 |
| 2012/0011575 | A1 | 1/2012 | Cheswick et al. |
| 2012/0094768 | A1* | 4/2012 | McCaddon ........ H04N 21/8545 463/42 |
| 2012/0295764 | A1* | 11/2012 | Brammer ........... A63B 24/0087 482/9 |
| 2013/0222640 | A1 | 8/2013 | Baek et al. |
| 2013/0305908 | A1 | 11/2013 | Iwase et al. |
| 2014/0086454 | A1 | 3/2014 | Bauer et al. |
| 2014/0253743 | A1 | 9/2014 | Loxam et al. |
| 2014/0309775 | A1 | 10/2014 | Jenkinson |
| 2015/0082168 | A1* | 3/2015 | Brieussel ............ G06F 3/04842 715/716 |
| 2015/0310895 | A1* | 10/2015 | Shen ..................... G11B 27/34 386/241 |
| 2016/0066007 | A1* | 3/2016 | Zhang ................. H04N 21/234 725/116 |
| 2016/0173825 | A1 | 6/2016 | Polyakov et al. |
| 2016/0241864 | A1 | 8/2016 | Loyd et al. |
| 2016/0335796 | A1 | 11/2016 | Roimela |

OTHER PUBLICATIONS

Intuitive Circuits, LLC. GeoStamp® Audio: GPS to Audio Encoder. On-line catalog, http://www.icircuits.com, originally downloaded Sep. 2, 2014, 3 total pages.

Red Hen Systems, LLC. GeoVideo for ESRI ArcGIS. Product Sheets, http://www.redhensystems.com, originally downloaded Sep. 2, 2014, 2 total pages.

Red Hen Systems, LLC. isWHERE. On-line catalog, http://www.redhensystems.com, originally downloaded Sep. 2, 2014, 1 page.

Red Hen Systems, LLC. MediaMapper 5.3. Product Sheets, http://www.redhensystems.com, originally downloaded Sep. 2, 2014, 2 total pages.

Red Hen Systems, LLC. Video Mapping Encoders. On-line catalog, http://www.redhensystems.com, originally downloaded Sep. 2, 2014, 1 page.

Red Hen Systems, LLC. VMS-333. Product Sheets, http://www.redhensystems.com, originally downloaded Sep. 2, 2014, 4 total pages.

Red Hen Systems, LLC. VMS-HDII. Product Sheets, http://www.redhensystems.com, originally downloaded Sep. 2, 2014, 2 pages.

VISION4CE. Grip DVR. On-line catalog, http://www.vision4ce.com, originally downloaded Sep. 2, 2014, 1 page.

VISION4CE. Truper PC & DVR. On-line catalog, http://www.vision4ce.com, originally downloaded Sep. 2, 2014, 1 page.

PCT International Patent Application No. PCT/US16/14084; International Search Report and Written Opinion of the International Searching Authority, dated Mar. 29, 2016, 15 pages.

U.S. Appl. No. 15/967,391; Office Action dated May 8, 2019.

* cited by examiner

FIG. 4

GEOSPATIAL MEDIA RECORDING SYSTEM

This United States Patent Application is a continuation of U.S. patent application Ser. No. 14/622,861, filed Feb. 14, 2015, hereby incorporated by reference herein.

I. FIELD OF THE INVENTION

A computer implemented geospatial media recording system which receives a global positioning signal from a global positioning system, a video stream from a video recorder and an audio stream from an audio recorder and encodes the global positioning system signal as global positioning data continuously embedded at intervals in the video stream or the audio stream at a frequency at the upper end or outside of the human audible range as a combined data stream which can be stored as one or more video files in the memory element of a computer retrievable by operation of a geospatial media program to display a video in a first display area and a geospatial representation in second display area on a display surface and further functions to extract global positioning data from the video to display a plurality of coordinate location indicators with associated metadata in the geospatial representation each at the coordinate location associated with the global positioning data embedded in the video.

II. BACKGROUND OF THE INVENTION

Conventionally, recordings can include embedded attribute data in the data stream enabling playback of the recording containing the attribute data by a playback device. The attribute data can contain information unique to the recording. However, conventional attribute data embedding methods may locate the attribute data at the beginning or the end of the data stream which may result in loss of the attribute data with respect data stream segments excised from the data stream. Additionally, attribute data embedded within recordings within the audible range of human hearing may generate background noise during playback of the recording and conventionally embedded attribute data within recordings can be lost when transcoded. Moreover, conventional playback of a recordings embedded with attribute data may not include global positioning data continuously embedded a intervals in the recording nor a coordinate encoded geographic space adapted to identify the location coordinates associated with real time recording.

There would be a substantial advantage in an inventive geospatial recorder operable to continuously embed global positioning data at intervals in the data stream of a recording at an embedding frequency at the upper end or outside the audible range of human hearing and to provide a geospatial recording system operable to concurrently playback the recording and display a geospatial representation of a coordinate encoded geographic space adapted to generate one or more coordinate location indicators corresponding to location coordinates continuously embedded at intervals in the data stream of the recording and to provide editors useful in editing the data stream or data stream segments of the recording without loss of the embedded global positioning data.

III. SUMMARY OF THE INVENTION

Accordingly, a broad object of particular embodiments of the invention can be to provide a geospatial recorder having a processor in communication with a memory element containing a geospatial recording application (computer readable media) executable by the processor to receive and decode a global positioning signal generated by a global positioning system, receive a video stream from a video recorder, and receive an audio stream from an audio recorder and to further function to generate a combined data stream containing video stream data and audio stream data one or both continuously embedded at intervals with the global positioning data and as to particular embodiments continuously embed the audio stream at intervals with the global positioning data at an embedding frequency at an upper end of or outside of the human audible range or as a text overlay in the video stream data.

Another broad object of particular embodiments of the invention can be to provide a geospatial recorder having a processor in communication with a memory element containing a geospatial recording application executable by the processor to generate a combined data stream containing video stream data and audio stream data one or both continuously embedded at intervals with the global positioning data and to further function to receive waypoint signals to set waypoints (or bookmarks) in the global positioning data each waypoint associated with a video image and the corresponding embedded global positioning data in the combined data stream) for retrievable storage in the memory element as a companion file.

Another broad object of particular embodiments of the invention can be to provide a geospatial recording system in which one or a plurality of nodes are connected to the geospatial recorder or connected to one or more server computers which retrievably store the combined data stream generated by the geospatial recorder and further include a processor in communication with a memory element containing a geospatial media program (computer readable media) executable by the processor to concurrently display on a display surface of one or more nodes a graphical user interface including playback of a video associated with video stream data embedded with global positioning data, and including a geospatial representation of a coordinate encoded geographic space including coordinate location indicators located at coordinate locations in the geospatial representation corresponding to the location coordinates included in the embedded global positioning data associated with the video images in the video.

Another broad object of particular embodiments of the invention can be to provide a geospatial recording system including a processor in communication with a memory element containing a geospatial media program (computer readable media) executable by the processor to display an image on the display surface of a node and to further display a global positioning data entry field into which location coordinates longitude latitude, and altitude (respectively X, Y, Z) can be entered to associate or overwrite location coordinates associated with the image.

Another broad object of particular embodiments of the invention can be to provide a geospatial recording system including a processor in communication with a memory element containing a geospatial media program (computer readable media) executable by the processor to display on the display surface of a node a video associated with video stream data embedded with global positioning data and to further display a geospatial representation of a coordinate encoded geographic space including coordinate location indicators located at coordinate locations in the geospatial representation corresponding to the location coordinates included in the embedded global positioning data associated with the video images in the video and to display a video segment selector for selection of a video segment start point and a video segment end point to identify a video segment and associated data stream segment and to extract the video segment and associated data stream segment and to splice the video segment start point to the video segment end point allowing playback of the video with omission of the defined video segment.

Another object of particular embodiments of the invention is to provide a geospatial recording system including a processor in communication with a memory element containing a geospatial media program (computer readable media) executable by the processor to display on the display surface of a node a video associated with video stream data embedded with global positioning data and to display a geospatial representation of a coordinate encoded geographic space including coordinate location indicators located at coordinate locations in the geospatial representation corresponding to the location coordinates included in the embedded global positioning data associated with the video images in the video and to display an annotation entry field including one or more annotation entry areas for entry of annotations and associating the annotation with a video image of the video.

Naturally, further objects of the invention are disclosed throughout other areas of the specification, drawings, photographs, and claims.

IV. BRIEF DESCRIPTION OF THE DRAWINGS

Figure 3:
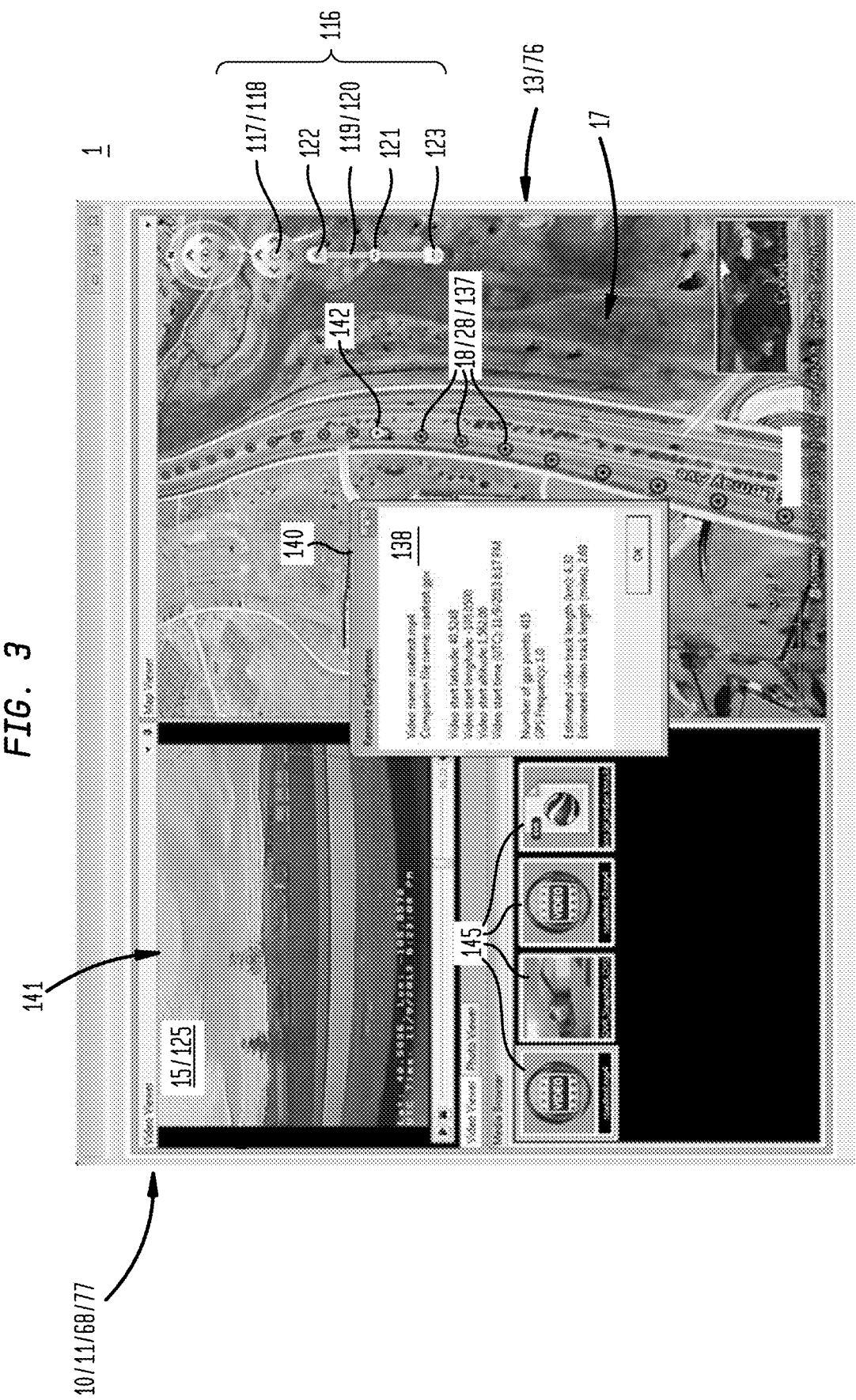

FIG. 3 is an illustration of particular embodiment of a graphic user interface which concurrently displays on a display surface a video generated from a combined data stream continuously embedded at intervals with global positioning data and a geospatial representation including a plurality of coordinate location indicators each located the location coordinates included in global positioning data associated with one more video images of the video.

FIG. 4 is an illustration of particular embodiment of a graphic user interface which concurrently displays on a display surface a plurality of videos generated from a plurality of combined data stream each continuously embedded at intervals with global positioning data and a corresponding plurality of status indicators pertaining to global positioning data received or waypoints bookmarked in the global positioning data.

Figure 5:
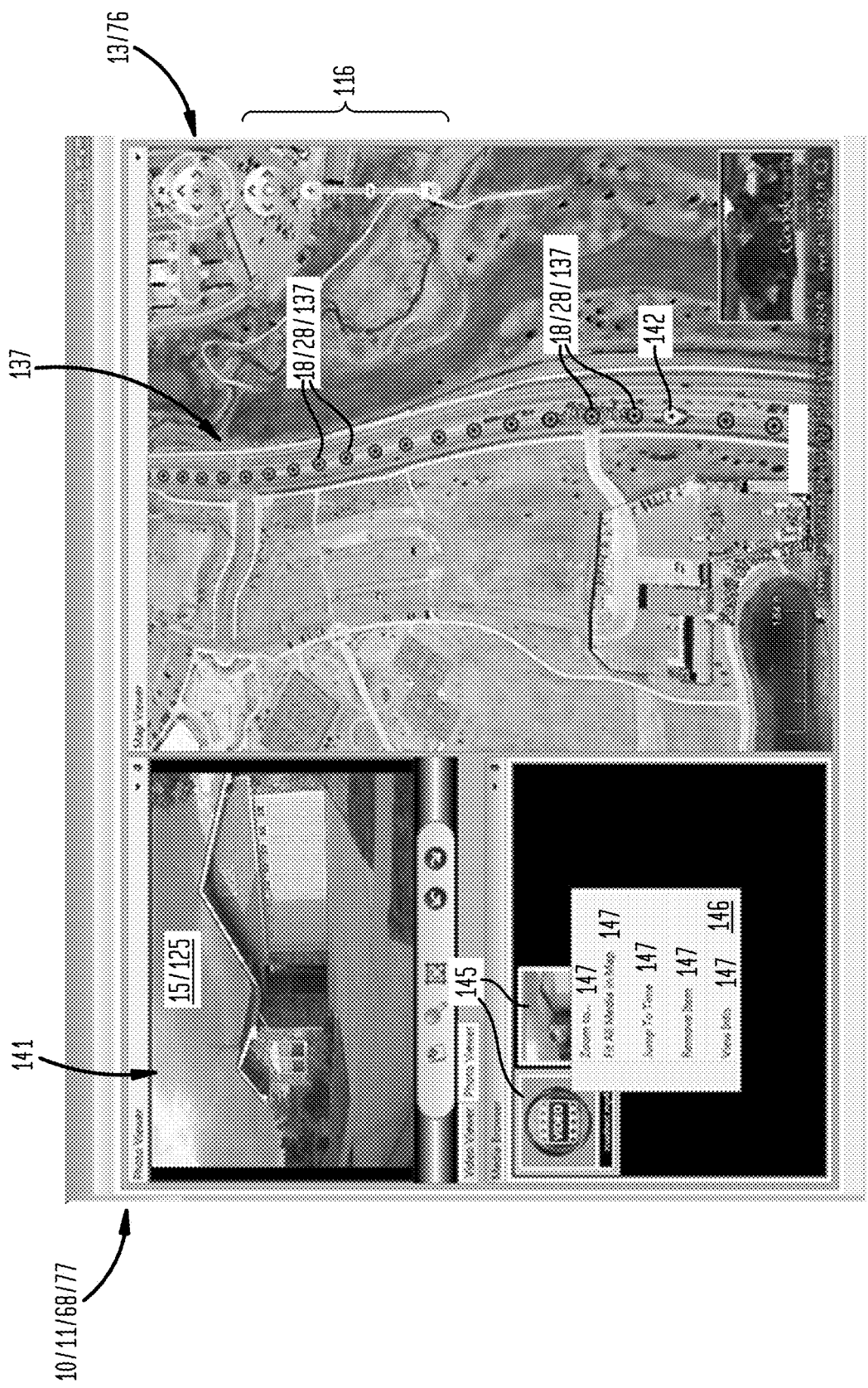

FIG. 5 is an illustration of particular embodiment of a graphic user interface which displays media icons associated with a media file retrievably stored in a media database which upon retrieval concurrently displays on a display surface a video generated from a combined data stream continuously embedded at intervals with global positioning data and a geospatial representation including a plurality of coordinate location indicators each located in the geospatial representation at the location coordinates included in global positioning data associated with the video.

Figure 6:
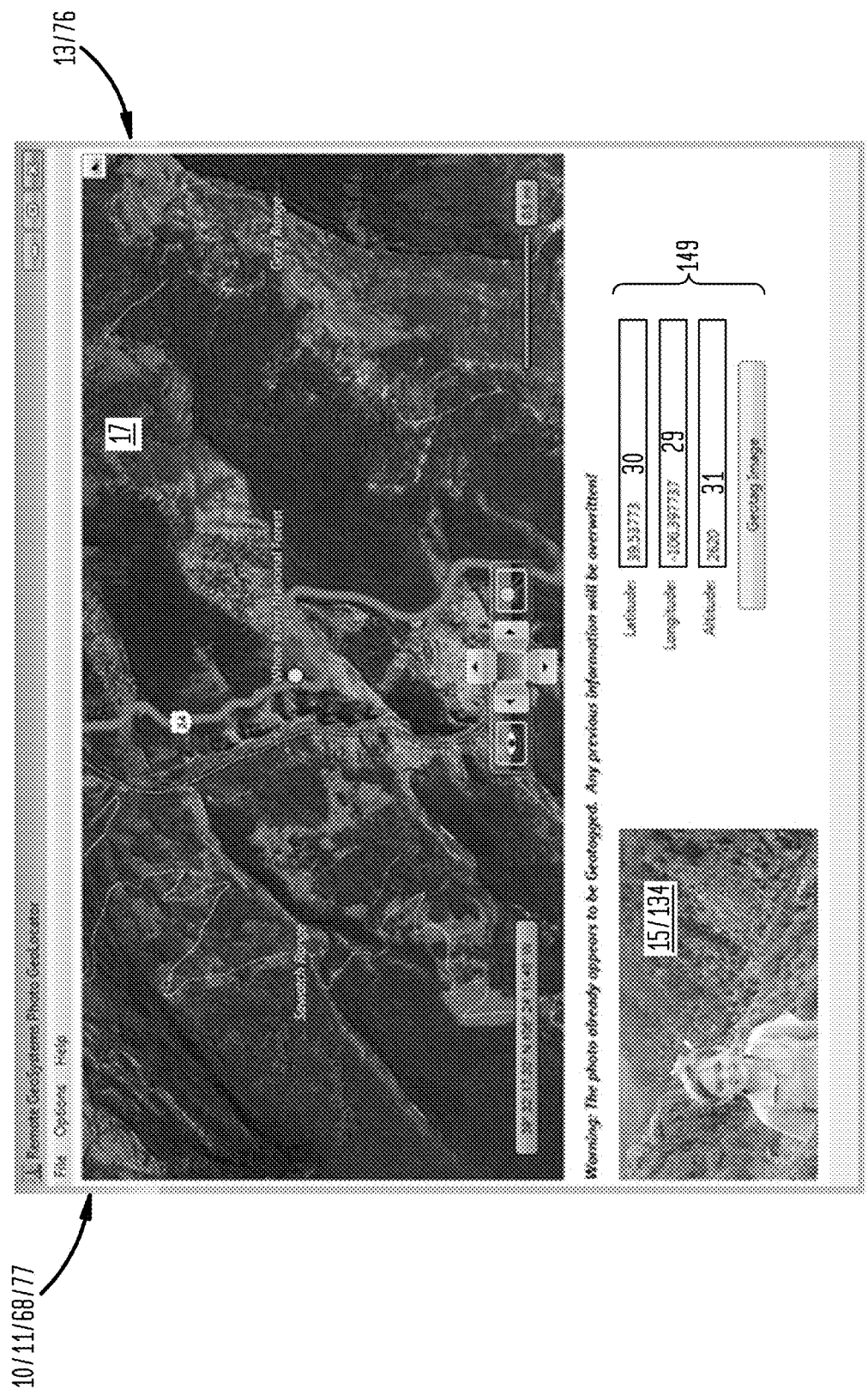

FIG. 6 is an illustration of particular embodiment of a graphic user interface which concurrently displays an image associated or associable with global positioning data and a global positioning data entry field displaying location coordinates corresponding to the associated global positioning data or in which location coordinates can be entered or edited for association with the image.

Figure 7:
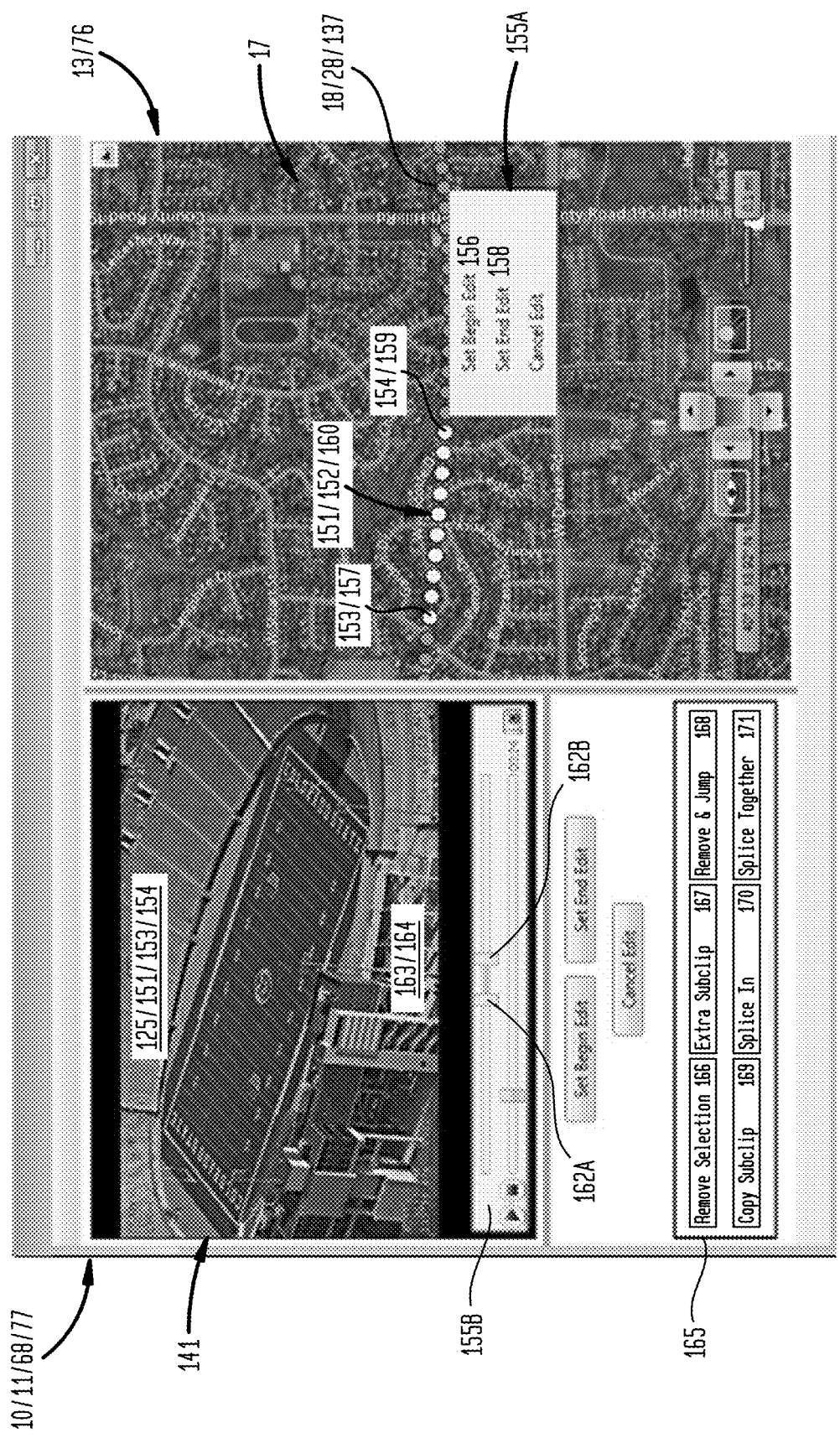

FIG. 7 is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates included in the global positioning data associated with one more video images of the video and displays a video segment selector which allows one video image or video segment including a plurality of video images to be selected.

Figure 8A:
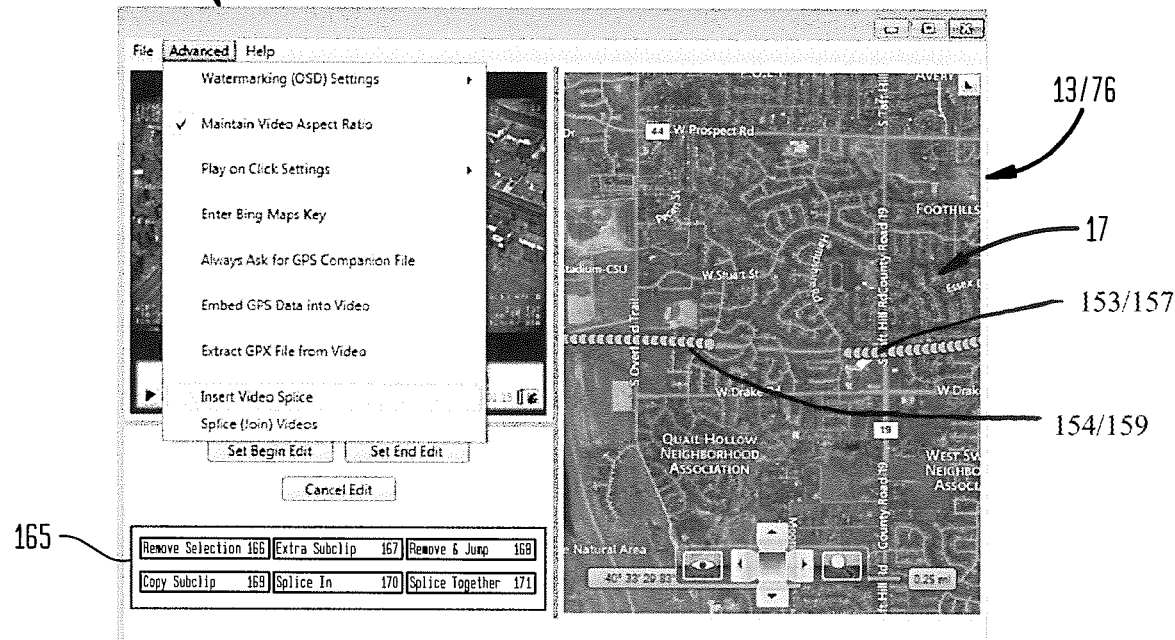

FIG. 8A is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates included in the global positioning data associated with one more video images of the video in which a video segment has been selected having a video segment start point and a video segment end point with the selected video segment deleted from the video and the corresponding coordinate location indicators deleted from the geospatial representation.

Figure 8B:
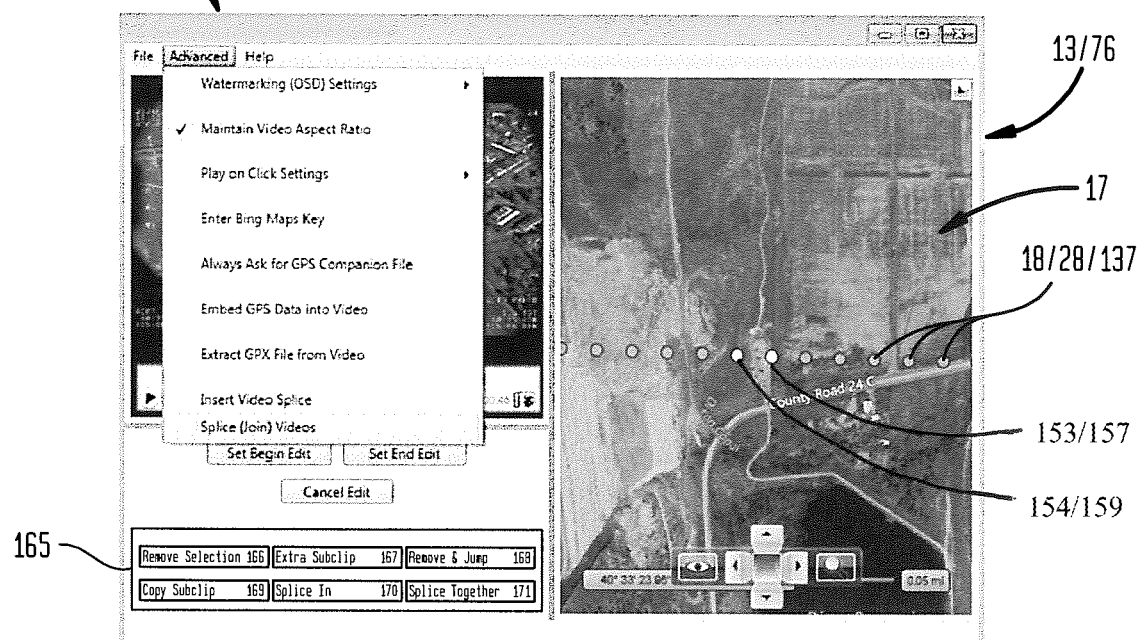

FIG. 8B is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates corresponding to the global positioning data associated with one more video images of the video in which a selected video segment between a video segment start point and a video segment end point has been extracted from the video and the corresponding coordinate location indicators between the video segment start point and a video segment end point have been removed from the geospatial representation and the a video segment start point and a video segment end point spliced as concurrently shown in the geospatial representation by locating the coordinate location indicators corresponding to the video segment start point and a video segment end point proximate each other with concurrent removal of geospatial representation associated with the extracted video segment.

Figure 9:
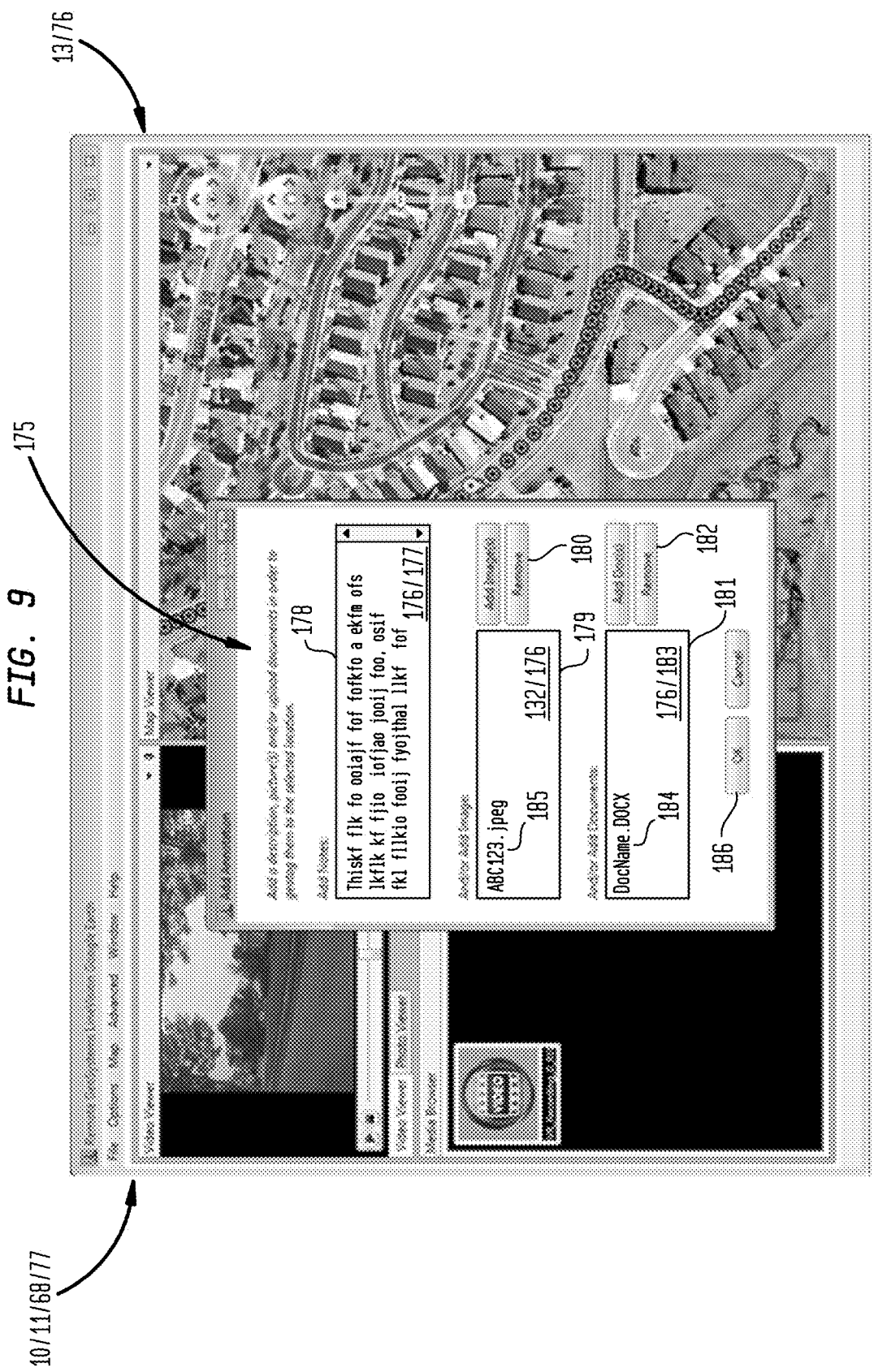

FIG. 9 is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates corresponding to the global positioning data associated with one more video images of the video and an annotation entry field having a plurality of annotation entry areas in which annotations can be entered for association with a video image and corresponding coordinate location in the geospatial representation.

V. DETAILED DESCRIPTION OF THE INVENTION

Figure 1:
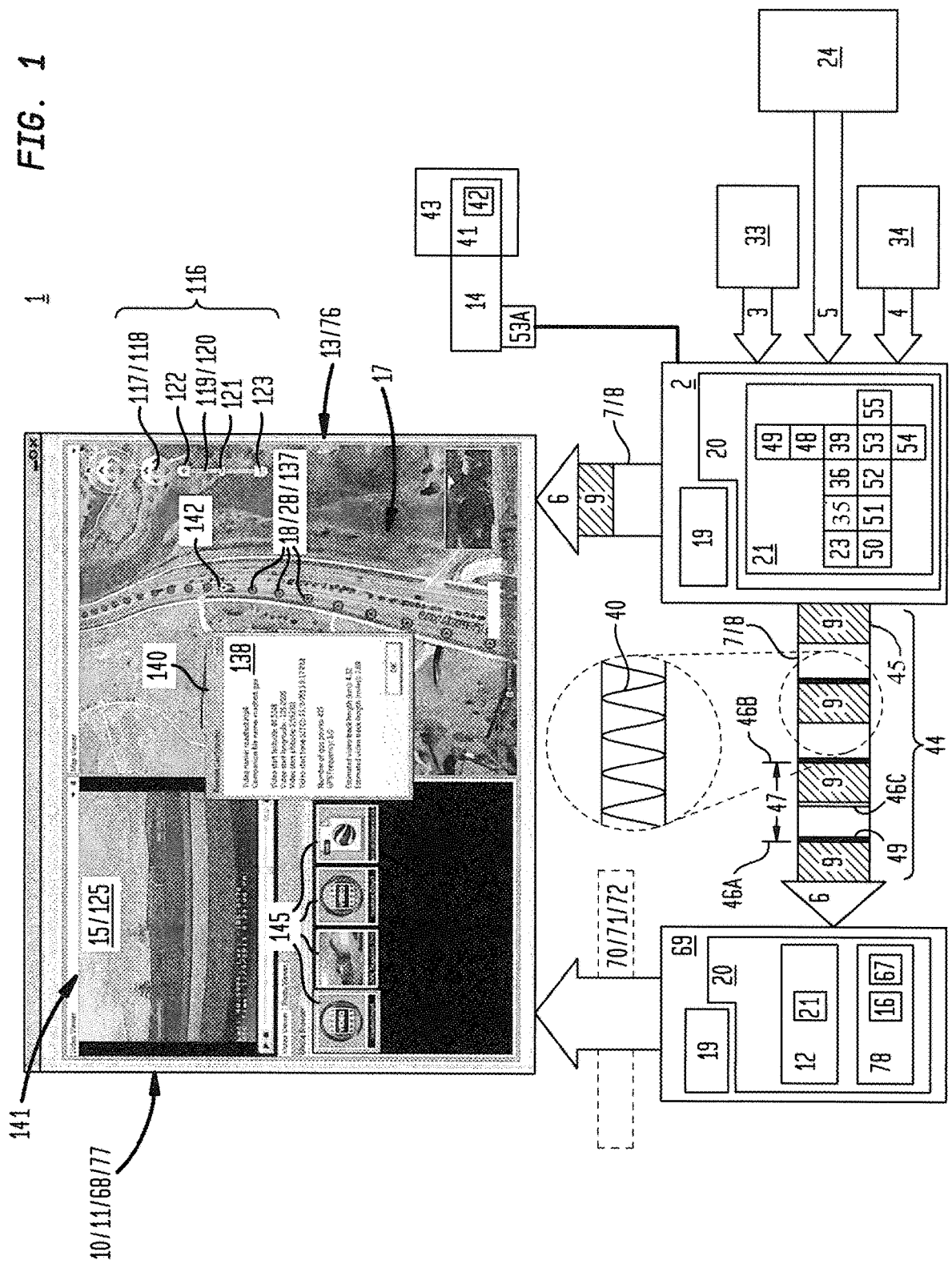
FIG. 1 is a block diagram of a particular embodiment of a geospatial recorder operable in an embodiment of a geospatial media recording system.

Now referring primarily to FIG. 1, which provides general overview of a geospatial media recording system (1). The geospatial recorder (2) can operate discretely to acquire and encode a video stream (3), an audio stream (4) and global positioning signal (5) generating a combined data stream (6) including video stream data (7) and audio stream data (8), either or both of which, are continuously embedded at intervals with global positioning data (9). The geospatial recorder (2), as part of the geospatial media recording system (1), can be connected to a computer network (10) which can include one or a plurality of nodes (11) each containing or having access to a geospatial media program (12) which implements a graphical user interface (13) interactive with a user (14) to display a video image (15) corresponding to the video stream data (7) (whether during acquisition by the geospatial recorder (2) or by retrieving a media file (16)) and to concurrently display a geospatial representation (17) in which one or a plurality of coordinate location indicators (18) can be generated based on extraction of the global positioning data (9) embedded in the video steam data (7) or audio stream data (8).

Embodiments of the geospatial media recording system (1) are described in the general context of a processor (19) in communication with a memory element (20) which contains the geospatial media program (12) providing a computer readable media which includes computer-executable instructions such as an application program or program modules which utilize routines, programs, objects, components, data structures, or the like, executable by the processor (19) to perform particular functions or tasks or implement particular abstract data types, or the like; however, it is not intended that embodiments of the geospatial media program (12) be limited to a particular computer code, set of computer-executable instructions or protocols.

The Geospatial Recorder

Figure 2:
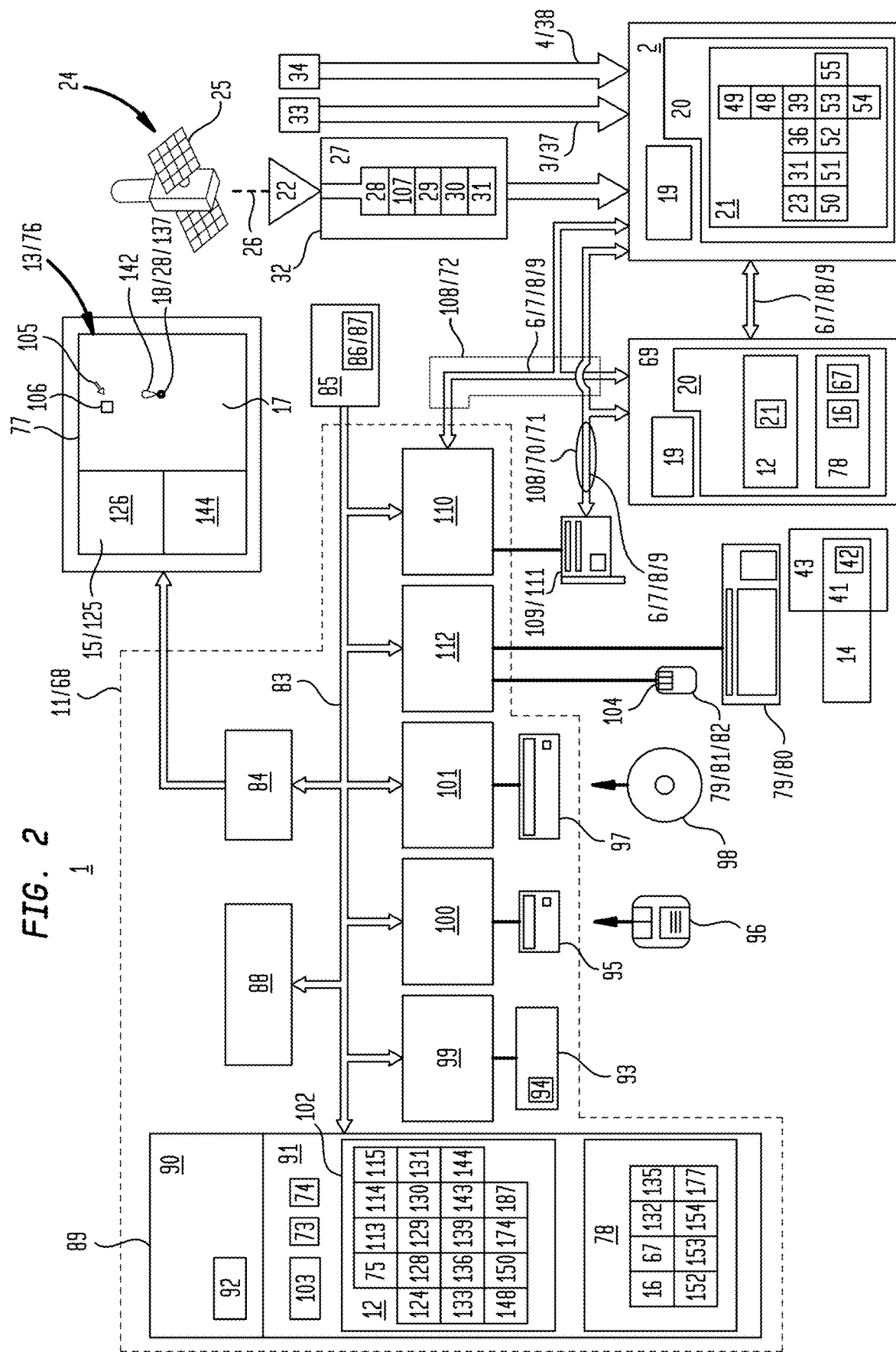
FIG. 2 is a block diagram of an illustrative computer means, network means and computer-readable medium which provides computer-executable instructions to provide an embodiment of the geospatial recorder and geospatial media recording system.

Now referring primarily to FIGS. 1 and 2, the geospatial recorder (2) includes or has access to a processor (19) in communication with a memory element (20) containing or having access to a geospatial recording application (21), which can be discrete from or a part of the geospatial media program (12). The geospatial recording application (21) includes a global positioning signal receiver module (23) capable upon execution of receiving and decoding the global positioning signal (5) generated by a global positioning system (24). The term "global positioning system (24)", for the purposes of this invention, means a plurality of earth-orbiting satellites (25) each transmitting a satellite positioning signal (26) continuously towards the Earth (27), that enables a coordinate location (28), including a longitude (29), a latitude (30) and an altitude (31) (respectively X, Y, Z) of the global positioning signal receiver (22) on or near the Earth's surface (32) to be accurately estimated from the difference in arrival times of the satellite positioning signals (26) from the plurality of earth-orbiting satellites (25). The accuracy of the coordinate location (28) depending upon the number of satellite positioning signals (26) locked onto in determining the coordinate location (28). For example, to provide a coordinate location (28) with an accurate three dimensional location (X, Y, Z), four satellite positioning signals (26) must be locked onto while a coordinate location (28) limited to a longitude (29) and a latitude (30) (X, Y) can be gained by locking onto two or three satellite positioning signals (26).

The geospatial recorder (2) can further include a video recorder (33) and an audio recorder (34). The geospatial recording application (21) can further include a video receiver module (35) which upon execution receives the video stream (3) from the video recorder (33) and an audio receiver module (36) which upon execution receives the audio stream (4) from the audio recorder (34). The term "video stream (3)" for the purposes of this invention, means one or more channels of video signal (37) being transmitted, whether streaming or not streaming, analog or digital. The term "audio stream (4)" for the purposes of this invention, means one or more channels of audio signal (38) being transmitted, whether streaming or not streaming, analog or digital. The term "video recorder (33)" for the purposes of this invention, means any device capable of recording one or more video streams (3). Examples of a video recorder include, but are not necessarily limited to, a video camera, a video surveillance recorder, a computer containing a video capture card, mobile phones having video recording capabilities, or the like. The term "audio recorder (34)" for the purposes of this invention, means any device capable of recording one or more audio streams (4). Examples of an audio recorder (34) include, but are not necessarily limited to, a video camera having audio recording capabilities, mobile phones, a device containing a mic-in input, a device having a line-in input, a computer containing an audio capture card, or the like.

The geospatial recording application (21) can further include an encoder module (39) which upon execution encodes the global positioning system signal (5) as global positioning data (9), the video stream (3) as video stream data (7), and the audio stream (4) as audio stream data (8). The encoder module (39) upon execution further functions to embed the global positioning data (9) in the video stream data (7) or the audio stream data (8). The encoder module (39) further functions upon execution to generate the combined data stream (6) containing the video stream data (7) and the audio stream data (8) one or both embedded with the global positioning data (9). The encoded audio stream data (8) or video stream data (7) can be assembled in a container bit stream such as MP4, FLV, WebM, ASF, ISMA, MOV, AVI, or the like.

As to particular embodiments, the encoder module (39) can embed the global positioning data (9) in the audio stream data (8) at an embedding frequency (40) at about an upper end of a human audible range (41) or outside the human audible range (41) in Hertz. The embedding frequency (40) can occur at between about 15,000 Hz to about 23,000 Hz. As to particular embodiments, one or more embedding frequencies (41) can be pre-selected to reduce or substantially eliminate human audible sound (42) during reproduction of sound (43) associated with the audio stream data (8). One or more embedding frequencies (41) can be selected from the group comprising or consisting of: between about 15,500 Hz to about 16,000 Hz, between about 15,750 Hz to about 16,250 Hz, between about 16,000 Hz to about 16,500 Hz, between about 16,250 Hz to about 16,750 Hz, between about 16,500 Hz to about 17,000 Hz, between about 16,750 Hz to about 17,250 Hz, between about 17,000 Hz to about 17,500 Hz, between about 17,250 Hz to about 17,750 Hz, between about 17,500 Hz to about 18,000 Hz, between about 17,750 Hz to about 18,250 Hz, between about 18,000 Hz to about 18,500 Hz, between about 18,250 to about 18,750 Hz, between about 18,500 Hz to about 19,000 Hz, between about 18,750 Hz to about 19,250 HZ, between about 19,000 Hz to about 19,500 Hz, between about 19,250 Hz to about 19,750 Hz, between about 19,500 Hz to about 20,000 Hz, between about 19,750 Hz to about 20,250 Hz, between about 20,000 Hz to about 20,500 Hz, between about 20,250 Hz to about 20,750 Hz, between about 20,500 Hz to about 21,000 Hz, between about 20,750 Hz to about 21,250 Hz, between about 21,000 Hz to about 21,500 Hz, between about 21,250 Hz to about 21,750 Hz, between about 21,500 Hz to about 22,000

Hz, between about 21,750 Hz to about 22,250 Hz, between about 22,000 Hz to about 22,500 Hz, and between about 22,250 Hz to about 22,750 Hz.

The encoder module (39) upon execution can further function to continuously embed the global positioning data (9) at intervals in the audio stream data (8). The interval frequency (44) for embedding global positioning data (9) in the audio stream data (8) can be selected in the range of between about 1 Hz to about 5 Hz; however, a greater range can be utilized depending upon the application. For example, up to 100 Hz or even greater as improvements in the technology occur. As to particular embodiments, the interval frequency (44) can be between about 1 Hz or 5 Hz; although the interval frequency (44) can be selected from one or more of the group comprising or consisting of: between about 1 Hz to about 2 Hz, about 1.5 Hz to about 2.5 Hz, about 2 Hz to about 3 Hz, about 2.5 Hz to about 3.5 Hz, about 3 Hz to about 4 Hz, about 3.5 Hz to about 4.5 Hz, and about 4.0 to about 5 Hz or similarly incrementally selected throughout a wider range up to 100 Hz.

As to particular embodiments, the encoder module (39) upon execution can embed the global positioning data (9) in the video stream data (7). The global positioning data (9) can be embedded as a text overlay element (45) (for example, a closed captioning element) of the video stream data (7). The global positioning data (9) can be continuously embedded at intervals in the text overlay (45) of the video stream data (7) with an interval frequency (44) which is the same or similar to that utilized in embedding global positioning data (9) in the audio stream data (8), as above described.

With respect to embedding global positioning data (9), whether in the audio stream data (8) or the video stream data (7), the embedding can occur continuously at the selected frequency interval (44) for the entire duration of, or between a pair of data end points (46) (47) selected within the video stream data (7) or the audio stream data (8). The combined data stream (6) continuously embedded with the global position data (9) allows a data stream point (46) or data stream segments (47) to be isolated or excised from the combined data stream (6) without loss or having a reduced loss of the global positioning data (9) associated with the data stream point (46) or data stream segment (47).

The geospatial recording application (21) can further include a time code module (48) which upon execution functions to associate current date and time data (49) with the global positioning data (9) embedded in the audio stream data (8) or the video stream data (7) of the combined data stream (6).

The geospatial recording application (21) can further include a codec module (50) which functions to compress the combined data stream (9) including the global positioning data (9) embedded in the audio stream data (8) or the video stream data (7) of the combined data stream (6). The audio stream data (8) can be compressed using an audio codec (51) such as MP3, Vorbis, AAC, or the like. The video stream data (7) can be compressed using a video codec (52) such as H.264, VP8, or the like. The compressed combined data stream (6) embedded with the global positioning data (9) can be retrievably stored in the memory element (20) whether internal to the geospatial recorder (2) or in a computer network node (11) accessible by the geospatial recorder (2).

In a particular embodiment of the geospatial recorder (2), the geospatial recording application (21) can further include a waypoint input module (53) which upon execution can communicate with the global positioning system receiver module (23) and the video receiver module (35) to generate a waypoint (54) (also referred to as a "bookmark") at a data stream point (46C) associated with or at the activation time of the waypoint input module (53). The waypoint input module (53) can be activated by user interaction with a waypoint trigger (53A) (as illustrative examples, manual closure of a switch, keyboard stroke, mouse click, or the like). The waypoint input module (53) can further communicate with the time code module (48) to associate a current date and time data (49) with the waypoint (54). The geospatial recording application (21) can further include a video image extraction module (55) activated by execution of the waypoint input module (53) to extract a video image (15) and the corresponding embedded global positioning data (9) from the audio stream data (8) or the video stream data (7) of said combined data stream (6) at the waypoint (54) along with the associated current date and time data (49) for retrievable storage in the memory element (20) as a companion file (67).

The Geospatial Media Recording System

Again referring primarily to FIGS. 1 and 2, the geospatial recorder (2) can be connected to one or a plurality of nodes (11) including one or more client computers (68) or server computers (69) through a wide area network (70) ("WAN"), such as the Internet (71), or one or more local area networks (72) ("LAN"). As to particular embodiments, the one or more client computers (68) can take the form of a limited-capability computer designed specifically for navigation on the World Wide Web of the Internet (71). Alternatively, the one or more client computers (68) might be set-top boxes, intelligent televisions connected to receive data through an entertainment medium such as a cable television network or a digital satellite broadcast, hand-held devices such as smart phones, slate or pad computers, personal digital assistants or camera/cell phone, or multiprocessor systems, microprocessor-based or programmable consumer electronics, network PCs, minicomputers, mainframe computers, or the like.

Again referring primarily to FIGS. 1 and 2, each of the one or more client computers (68) can include an Internet browser (73) such as Microsoft's INTERNET EXPLORER®, GOOGLE CHROME®, MOZILLA FIREFOX®, or the like, which functions to download and render multimedia content that is formatted in "hypertext markup language" (HTML). In this environment, a server computer (69) might be programmed to implement the most significant portions of a graphical user interface (13). As to these embodiments, the geospatial media program (12) can further include a graphical user interface module (75) which implements the graphical user interface (13). The graphical user interface module (75) can be resident in the server computer (69) (as shown in the example of FIG. 1) and the one or more client computers (68) can use the Internet browser (73) to simply display downloaded content and to relay user inputs back to the server computer (69). The server computer (69) would respond by formatting screen displays (76) (as shown in the illustrative examples of FIGS. 3 through 9) and downloading the screen displays (76) for display on a display surface (77) associated with a client computer (68).

In other embodiments, the server computer (69) can be used primarily as a media database (78) for retrievable storage of media files (16), with primary responsibility for implementing the graphical user interface (13) being placed upon each of the client computer (68) (as shown in the example FIG. 2). As to these embodiments, each of the client computers (68) can execute the graphical user interface module (75) implementing the graphical user interface (13)

to format screen displays (76) and to retrieve media files (16) from the server computer (69) media database (78). While illustrative examples in this description attribute storage and retrieval of data to one server computer (69) for clarity, it is to be understood that various types of data may reside in one server computer (69) or one type of data can be distributed among a plurality of server computers (69). Embodiments of the invention can utilize server computers (69) to a lesser or greater number or extent depending upon the application. The geospatial media program (12) can upon execution can provide media files (16) and other data obtained from the server computer (69) in a common format.

A user (14) can enter commands and information into one or more client computers (68) through input devices (79) such as a keyboard (80) or a pointing device (81) such as a mouse (82); however, any method or device that converts user (14) action into commands and information can be utilized including, but not limited to: a microphone, joystick, game pad, touch screen, or the like. A display surface (77) such as a monitor screen or other type of display device can also be connected to a bus (83) via a video display interface (84), such as a video adapter, or the like. The graphical user interface (13) can in part be presented as an interactive graphic user interface (13) on the display surface (77). In addition to the display surface (77), each of the one or more client computers (68) can further include other peripheral output devices (85) such as speakers (86) and printers (87); although the peripheral output devices (85) are not so limited.

Now referring primarily to FIG. 2, as a non-limiting example, a client computer (68) can provide a computer processor (88), a computer memory element (89), and a bus (83) which operably couples components of the client computer (68), including without limitation the computer memory elements (89) to the computer processor (88). The computer processor (88) can comprise one central-processing unit (CPU), or a plurality of processing units which operate in parallel to process digital information. The bus (83) may be any of several types of bus configurations including a memory bus or memory controller, a peripheral bus, and a local bus using any of a variety of bus architectures. The computer memory element (89) can without limitation be a read only memory (ROM) (90) or a random access memory (RAM) (91), or both. A basic input/output system (BIOS) (92), containing routines that assist transfer of data between the components of the client computer (68), such as during start-up, can be stored in ROM (90). The client computer (68) can further include a hard disk drive (93) for reading from and writing to a hard disk (94), a magnetic disk drive (95) for reading from or writing to a removable magnetic disk (96), and an optical disk drive (97) for reading from or writing to a removable optical disk (98) such as a CD ROM or other optical media. The hard disk drive (93), magnetic disk drive (95), and optical disk drive (97) can be connected to the bus (83) by a hard disk drive interface (99), a magnetic disk drive interface (100), and an optical disk drive interface (101), respectively. The drives and their associated computer-readable media provide nonvolatile storage of computer-readable instructions, data structures, program modules and other data for the client computer (68). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules (102) may be stored on or included in the hard disk drive (93), magnetic disk (96), optical disk (98), ROM (90), or RAM (91), including an operating system (103), one or a plurality of application programs and in particular the geospatial media program (12).

A "click event" occurs when the user (14) operates a program, application, module, or code function through the use of a command which for example can include pressing or releasing the left mouse button (104) while a pointer (105) is located over a control icon (106) (or other interactive field which activates a function) displayed in the graphical user interface (13). However, it is not intended that a "click event" be limited to the press and release of the left button (104) on a mouse (82) while a pointer (105) is located over a control icon (106), rather, a "click event" is intend to broadly encompass a command by the user (14) through which a function of a program, application, module, or code can be activated or performed, whether through selection of one or a plurality of control icon(s) (106) or fields, or by user voice command, keyboard stroke, mouse button, touch on a touch screen, or otherwise. It is further intended that control icons (106) can be configured or displayed without limitation as a bullets, point, a circle, a triangle, a square, a polygon (or other geometric configurations or combinations or permutations thereof), or as fields or boundary elements created in displayed images, or as fields in which locations, addresses, or other terms can be entered manually, such as: a street address, a zip code, a county code, a natural area code, a longitude (29) (also referred to as "X"), a latitude (30) (also referred to as "Y"), an altitude (31) (also referred to as "Z"), location coordinates (107) (X and Y or Z or XYZ), or other notation, script, character, or the like.

The client computer (68) may operate in a networked environment using one or more logical connections (108) to connect to other nodes (11) such as the geospatial recorder (2) or a server computer (69). These logical connections (108) can be achieved by one or more communication devices (109) coupled to or a part of the client computer (68); however, the invention is not limited to a particular type of communications device (109). The server computer (69) can be another computer, a server, a router, a network personal computer, a client, a peer device or other common network node, and can include a part or all of the elements above-described relative to the client computer (68). The logical connections (108) depicted in FIG. 2 can include a LAN (72) or WAN (70). Such networking environments are commonplace and include for example: enterprise-wide computer networks, intranets, wireless networks, global satellite networks, cellular phone networks, the Internet (71), or the like.

When used in a LAN-networking environment, the client computer (68) can be connected to the LAN (72) through a network interface (110) or adapter, which is one type of communications device (109). When used in a WAN-networking environment, the client computer (68) typically includes a modem (111), a type of communications device (109), or other type of communications device for establishing communications over the WAN (70), such as the Internet (71) (as shown in the example of FIG. 1). The modem (111), which may be internal or external to the client computer (68), can be connected to the bus (83) via a serial port interface (112). In a networked environment, program modules depicted relative to the client computer (68), or portions thereof, may be as to certain embodiments of the invention be stored in the server computer (69) (as shown in the examples of FIGS. 1 and 2). It is appreciated that the network connections (109) shown are exemplary and other means of and communications devices for establishing a communications link between the nodes (11) can be used.

Again referring primarily to FIGS. 1 and 2, the client computer (68) can encompass a single client computer (68) or can encompass a plurality of client computers (68) each of which can be operated by a user (14). The user (14), a person, a plurality of persons, a business entity, or otherwise, can execute the geospatial media program (12) including the user interface module (75) to display a graphical user interface (13) in which media files (16) retrieved from the server computer (69), or the combined data stream (6) received directly from the geospatial recorder (2), can be displayed in a common format on the display surface (77).

Now referring to FIGS. 3-16, an exemplary embodiment of a graphical user interface (13) generated by the graphical user interface module (75) is shown. The graphical user interface (13) can be implemented using various technologies and different devices, depending on the preferences of the designer and the particular efficiencies desired for a given circumstance. By click event, the user (14) can activate the graphical user interface module (75) which functions to display the graphical user interface (13) on a display surface (77) of the client computer (68).

The geospatial media program (12) further includes a geospatial representation module (113) which upon execution functions to retrieve and display a geospatial representation (17) of a coordinate encoded geographic space (114) (such as the Earth's surface (32)) on the display surface (77) of the client computer (68). The geographic representation (17) can take any viewable form having any number of dimensions, any manner of symmetry, geometric properties, whether finite or infinite, which can be adapted to allow selection of a coordinate location (28) having location coordinates (107) (X or Y or XY or XYZ) by execution of the geospatial media program (12), whether by utilizing a pointer (105) pointing to a coordinate location (28) in the geographic representation (17), or by entering location coordinates (107), selection from a drop down list of coordinate locations (28), key word search, photograph or data coordinate locations, photo captions, photo attribute data generated by a camera or other devices, or search criteria derived from all of the above, or the like attributable to the coordinate encoded geographic space (114). Typically, the geospatial representation (17) will be in the form of a graphical image, an aerial image, a satellite image, a thermal image, a topography map, a geo-planar map, a photograph, whether in two or three dimensions. For example, the geospatial representation module (113) can access a server computer (69) which can serve, as examples: GOGGLE MAPS®, GOGGLE EARTH®, BING MAPS®, MAPQUEST®, ESRI ARCGIS®, PANORAMIO®, or the like.

In the example provided by FIG. 3, the geospatial representation module (113) retrieves from a server computer (69) an coordinate encoded geographic space (114), whether in whole or in part, which can be continuous or discontinuous, and decodes the coordinate encoded geographic space (114) to display the geospatial representation (17) on the display surface (77) of the client computer (68). The geographic representation (17) can be displayed as a three dimensional image of a portion of the Earth's surface (32), including, at the displayed scale, roadways, manmade structures, or the like. As to particular embodiments, the geographic representation (17) can further display certain geographic and administrative boundaries such as such as states, counties, cities, towns or residential areas; however, it is not intended that embodiments of the geographic representation (17) necessarily include other than a graphical representation (17) including a coordinate encoded geographic space (115) in which location coordinates (107) (X, Y or X, Y, Z) define a unique coordinate location (28) in the geospatial representation (17).

Now referring primarily to FIGS. 2 and 3, as to particular embodiments, the geospatial media program (12) can further include a navigation module (115) which upon execution can display a navigation controller (116) on the display surface (77) of the client computer (68). The geographical representation (17) displayed on the display surface can be operably coupled to the navigation controller (116) to allow the geographic representation (17) to be directionally moved on the display surface (77) by user interaction with the navigation controller (116) (for example with a pan tool (117)) to display portions of the geographic representation (17) of the coordinate encoded geographic space (114) which at the displayed scale, lie outside of the geographic representation (17) displayed on the display surface (77). As to certain embodiments, the navigation controller (116) can be displayed in the form of arrows (118) correspondingly pointing in one or more cardinal directions (North, East, South, West). An arrow (118) by click event activates the navigation module (115) to move the view of the geographic representation (17) directionally on the display surface (77).

The navigation controller (116) can further include an image scale control (119). The geographic representation (17) can be operably coupled to image scale control (119) to allow the geographic representation (17) to be increased or decreased in scale on the display surface (77) (for example with a zoom tool (120)). As to certain embodiments, the image scale control (119) can be displayed on the display surface (77) in the form of a slider element (121) which can be dragged up or down to correspondingly increase or decrease the scale of the geographic representation (17) displayed on the display surface (77) and can further include a plus icon (122) or a minus icon (123) which by click event correspondingly increases or decreases scale of the geographic representation (17). However, these examples of directionally moving and altering scale of the geographic representation (17) are illustrative and other embodiments can allow the geographic representation (17) to be directionally moved or altered in scale by click event including one or more of key stroke, mouse drag, menu, toolbar, or the like.

Again referring primarily to FIGS. 3 and 4, the geospatial media program (12) can further include a media input module (124) which during acquisition of the video stream (3), the audio stream (4) and the global positioning signal (5) by the geospatial recorder (2), as above described, decodes the combined data stream (6) and either in a LAN (72) or a WAN (70) environment displays a video (125) on the display surface (77) of the client computer (68) currently with the geospatial representation (17) corresponding to the portion of the a coordinate encoded geographic space (114) associated with global positioning data (9) embedded in the audio stream data (8) or the video stream data (7) (as shown in the example of FIG. 3). A plurality of combined data streams (6) can each be decoded and each one can be concurrently displayed in a corresponding plurality of display surface areas (126) allowing the video (125) associated with each one of the plurality of combined data streams (6) to be concurrently viewed in corresponding one of the plurality of display surface areas (126). The media input module (124) can also function to provide a corresponding plurality of status indicators (127) correspondingly indicating the status of each of the plurality of combined data streams (6). The status indicators (127) can include location coordinates (107) (longitude (29) latitude (30), altitude (31), current date and time data (49) when the data stream was acquired the speed of the recorder(s) when the data stream was acquired, the satellite (25) strength of the global positioning data (9), or the like.

Each of the combined data streams (6) can be stored as media files (16) retaining the embedded global positioning data (9) in a server computer (69) media database (78) in the computer memory element (89). The media input module (124) can further function to retrieve from a server computer (69) or a client computer (68) a media file (16) retaining embedded global positioning data (9), as above described. The term "media file (16)" for the purposes of this invention means any type of file embedded with global positioning data (9) and without limiting the breadth of the foregoing can be an image file, a video file, document file, map files, shape files, extensible markup language file, keyhole markup language file, or the like.

Whether the media input module (124) functions during acquisition of the combined data stream (6) or functions to retrieve media files (16), the media input module (124) utilizes a plurality of different parsers (74) to read video data (7), audio data (8), and global positioning data (9) in the combined data stream (6) or from any file format or media type. Once the media input module (124) opens the media file (16) or receives the combined data stream (6), a global positioning data extraction module (128) functions to extract the global positioning data (9) from the combined data stream (6) or media file (16). The global positioning data extraction module (128) includes decoding applications which can be applied to the combined data stream (6) or media file (16) depending on the manner of embedding of the global positioning data (9) in the combined data stream (6) or media file (16). As an example, if the media file (16) comprises a video file (135) with the global positioning data (9) embedded in the audio stream (8), as above described, then an audio stream decoder (129) operates to decode the global positioning data (9). By way of a second example, if the media file (16) comprises a video file (135) with the global positioning data (9) embedded as a text overlay element (45), as above described, then an optical character recognition decoder (130) operates to decode the global positioning data (9).

The media input module (124) further functions to activate a view module (131) which functions to display the viewable content of the combined data stream (6) or the media file (16) on the display surface (77) of the client computer (68). For example, if the media file (16) comprises an image file (132) then the view module (131) activates an image viewer module (133) which functions to display an image (134) associated with the image file (132) on the display surface (77). As a second example, if the media file (16) comprises a video file (135) then the view module (131) activates a video viewer module (136) which functions to playback a video (125) associated with the video file (135) on the display surface (77) of the client computer (68). The media input module (124) along with the global positioning data extraction module (128) and view module (131) can concurrently open and concurrently display a plurality of combined data streams (6) or media files (16) on the display surface (77) of the client computer (68) along with the corresponding geospatial representation (17).

Now referring to FIG. 3, as to particular embodiments, as the combined data stream (6) is acquired, the media input module (124) can further function to generate and display one or a plurality of coordinate location indicators (18) in the geographic representation (17) based on the global positioning data (9) extracted by the global positioning data extraction module (128) from the combined data stream (6). Accordingly, as each video image (15) is displayed on the display surface (77) the global positioning data (6) can be extracted and converted to location coordinates (107) in the coordinate encoded geographic space (114) and a coordinate location indicator (18) can be displayed at the corresponding coordinate location (28) (for example X, Y or X, Y, Z) in the geographic representation (17). As above described, the global positioning data (9) can be embedded continuously at an interval frequency (44) in the audio stream data (8) or the video stream data (7) and correspondingly a plurality of coordinate location indicators (18) can be serially generated at intervals in the geographic representation (17) creating a video track (137) associated with the global positioning data (9) extracted at intervals from the audio stream data (8) or the video stream data (7).

Again referring to FIG. 3, the media input module (124) can further function to associate metadata (138) with each coordinate location (28) or coordinate location indicator (18) displayed in the geographic representation (17) which allows subsequent retrieval of the media file(s) (16) associated with the metadata (138) associated with each coordinate location (28) or coordinate location indicator (18). The media input module (124) can further track pointer (105) movement in the geographic representation (17). A metadata viewer module (139) upon hover of the pointer (105) over a coordinate location indicator (18) can cause display of a metadata image (140) including metadata (138) in readable form relating to media files (16) associated with the hovered over coordinate location indicator (18). Upon click event of the coordinate location indicator (18) the media input module (124) can further function to retrieve and open the media file (16) associated with the selected coordinate location indicator (18) to display the associated media (141) on the display surface (77). For example, if the media file (16) associated with the coordinate location indicator (18) is an image file (132) the media input module (124) activates the image viewer module (136) which functions to display an image (134) associated with the image file (132) on the display surface (77). Likewise, if the media file (16) associated with the coordinate location indicator (18) is a video file (135) then the media input module (124) activates the video viewer module (136) which functions to open and play back the video (125) associated with the video file (136) on the display surface (77) of the client computer (68). As to particular embodiments, the media input module (124) can commence playback of the video commencing at the location coordinates (107) or the coordinate location (28) of the selected coordinate location indicator (18). For example, if the selected coordinate location indicator (18) in the geospatial representation (17) has location coordinates (107) associated with 47 seconds into the video (125), the video viewer module (136) commences playback of the video at 47 seconds into the video (125). As to particular embodiments, as the video (125) plays, the geospatial representation module (17) can function to display a current coordinate location indicator (142) over the coordinate location indicator (18) in the geospatial representation (17) indicating the coordinate location (28) associated with the instantly displayed portion of the video (125). As to particular embodiments, if the coordinate location (28) of the displayed portion of the video (125) falls outside of the portion of the geospatial representation (17) displayed on the display surface (77), the geospatial representation module (113) can move the geospatial representation (17) to locate the current current coordinate location indicator (142) within onto the display surface (77).

Again referring primarily to FIGS. 2 and 5, the geospatial media program (21) can further include a media browser module (143) which functions to maintain the media files (16) along with the associated global position data (9) and metadata (138) in persistent storage allowing the media database (16) by operation of a search module (144) to be searched through user (14) interaction in the graphical user interface (13). Because all the data in a media file (16) is georeferenced by location coordinates (107) (X, Y or X, Y, Z) and date and time elements (49) advanced searches can be performed using georeferenced search elements. As to particular embodiments, the media browser module (143) can further function to generate and display a media icon (145) on the display surface (77) of the client computer (68). As an illustrative example, the media file (16) can comprise a video file (135) and the media icon (145) can comprise a video image (15) extracted from the associated video file (135). A pointer (105) hovered above the video image (15) (or by other click event) can activate the media browser module (143) and the geospatial representation module (113) to generate a geospatial representation (17) based on the global positioning data (9) embedded in the video file (135) and can further generate and display one location coordinate indicator (18) or the plurality of location coordinate indicators (18) as a video track (137) in the geospatial representation (17), as above described. The current location coordinate indicator (142) corresponding to the global positioning data embedded in the video image (15) displayed as the media icon (145) can be further generated and displayed in the geospatial representation (17). Additionally, by click event in the media icon (145) the media browser module (143) can generate and display a list of media options (146) with each media option (147) (such as zoom, fit all media in geospatial representation, jump to time, remove item, view metadata image, or the like) selectable by click event.

Now referring primarily to FIGS. 2 and 6, the geospatial media program (21) can further include an image editor module (148). A video image (15) extracted from a video (125) or an image (134), whether or not previously embedded with global positioning data (9), can be displayed on the display surface (77) by operation of the image viewer module (133), as above described. By click event (such as, pointer (105) hover over or pointer click event in the image (15) (134)), the image editor module (148) can be activated to generate and display on the display surface (77) a global positioning data entry field (149) into which location coordinates (107) (X, Y, Z) can be entered by user (14) interaction to define a coordinate location (28) to associate with the image (134). As to particular embodiments, entry of location coordinates (107) into the global positioning data entry field (149) activates the geospatial representation module (113) to generate and display the geospatial representation (17) corresponding to the entered location coordinates (107).

As to particular embodiments, if the image (15) (134) was previously embedded with global positioning data (9) display of the image (135) can also activate the geospatial representation module (113) to generate and display the geospatial representation (17) corresponding to the embedded global positioning data (9), as above described. Subsequent entry of location coordinates (107) (X, Y, Z) into the global positioning data entry field (149) overwrites the embedded global positioning data (9) embedded in the image (134) to newly define location coordinates (107) (X,Y,Z) and the coordinate location (28) associated with the image (134). The image (134) and newly defined location coordinates (107) can be saved as an image file (132).

Now referring primarily to FIGS. 2 and 7, the geospatial media program (12) can further include a video editor module (150). A video (125), whether or not previously embedded with global positioning data (9), can be generated and displayed on the display surface (77) by operation of the video viewer module (136). By click event (such as, pointer (105) hover over or by pointer click event in the video (125)), the video editor module (150) can be activated to allow the video (125) to be edited in various ways.

Now referring primarily to FIGS. 6 and 7, the video editor module (150) can function to allow the user (14) to view and extract each one of the video images (15) (frame by frame) at any point in the video (125) without loss of, and including, the associated global positioning data (9) and metadata (138), associated with each video image (15). Once the video image (15) is extracted from the video (125), the resulting video image (15) can be passed to the image editor module (148) and edited, as above described.

Again referring primarily to FIG. 7, the video viewer module (136) upon execution opens a video file (135) and displays the video (125) on the display surface (77) and activates the geospatial representation module (113) which functions to display the geospatial representation (17) on the display surface including the plurality of location coordinate indicators (18) or the video track (137) corresponding to the global positioning data (9) embedded at intervals in the video stream data (7) or the audio stream data (8). The video editor module (150) can further function to generate video segments (151) of the video (125) retaining the corresponding embedded global positioning data segment (152) in the video segment (151).

Now referring primarily to FIG. 7, two illustrative examples of selecting a pair of data stream end points (46A) (46B) as a video segment start point (153) and a video segment end point (154) to define a video segment (151) of a video (125) are shown. In the first illustrative example, the video editor module (150) displays a video segment selector (155A) associated with the geospatial representation (17) displayed on the display surface (77). The video segment selector (155A) includes a video segment start point selection icon (156) which by click event functions to set the video segment start point (153) by click event on a first location coordinate indicator (157) in a video track (137). The video segment selector (155) further includes a video segment end point selection element (158) which functions to set the video segment end point (154) by click event on a second location coordinate indicator (159) in the video track (137). As to particular embodiments, the video editor module (150) can further function to identify the video segment (151) defined by the selected video segment start point (153) and the video segment end point (154) by visually observable alteration of the location coordinate indicators (18) inclusive of the video segment (151). As one illustrative example, the location coordinate indicators (18) inclusive of the video segment (151) can change color (160) in the geospatial representation (17).

In the second illustrative example, the video editor module (150) displays a video segment selector (155B) associated with the video (125) displayed on the display surface (77). The video segment selector (155B) includes a first video image selection slider (162A) operable to advance the video (125) video image (15) by video image (15) which by click event functions to set the video segment start point (153) associated with a first video image (163) displayed on the display surface (77). The video segment selector (155B)

further includes a second video image selection slider (162B) operable to advance the video (125) video image (15) by video image (15) which by click event functions to set the video segment end point (154) associated with a second video image (164) displayed on the display surface (77). As to particular embodiments, the video editor module (150) can further function to identify the video segment (151) defined by the selected video segment start point (153) and the video segment end point (154) in the video track (137) displayed in geospatial representation (17). Again, the video segment can be identified by visually observable change of color (160) of the location coordinate indicators (18) in the geospatial representation (17) inclusive of video segment (151).

Now referring primarily to FIGS. 7, 8A and 8B, the video editor module (150) can further function to display a video segment editor (165) including a video segment removal icon (166) which by click event activates the video editor module (150) which functions to delete the selected video segment (151) from the video (125). The deletion of the selected video segment (151) also results in deletion of the corresponding coordinate location indicators (18) being removed from the geospatial representation (17) (as shown in the example of FIG. 8A as a line extending between selected first and second coordinate location indicators (157) (159)). The video editor module then functions to join the video segment start point (153) and the video segment end point (154) (splices the pair of data stream end points 46A and 46B) resulting in a continuous playback video (125) of shorter length and a geospatial representation (17) having the area corresponding to the deleted location coordinate indicators (18) removed (as shown in the example of FIG. 8B in which the selected first and second coordinate location indicators (157) (159) are drawn proximate each other).

The video editor module (150) can further function to display a video segment extraction icon (167) which by click event activates the video editor module (150) which functions to extract the selected video segment (151) from the video (125) along with the associated global positioning data (9). In the video (125), the extracted video segment (151) along with associated global positioning data (9) is deleted and the corresponding coordinate location indicators (18) are deleted from the geospatial representation (17) (as shown in the example of FIG. 8A). The extracted video segment (151) along with the associated global positioning data (9) is preserved and can be saved as media file (16). The video editor module then functions to join the video segment start point (153) and the video segment end point (154) (splices the pair of data stream end points 46A and 46B) resulting in a continuous playback video (125) of shorter length and a geospatial representation (17) having with the area corresponding to the deleted location coordinate indicators removed (as shown in the example of FIG. 8B).

The video editor module (150) can further function to display a video segment extract and advance icon (168) which by click event activates the video editor module (150) which functions to extract the selected video segment (151) from the video (125) along with the associated global positioning data (9). In the video (125), the extracted video segment (151) along with associated global positioning data (9) replaced with a blank insert of the same duration as the extracted video segment (151) to retain the original time duration of the video (125) and the corresponding coordinate location indicators (18) are deleted from the geospatial representation (17) and replaced with a blank insert (as shown in the example of FIG. 8A). The extracted video segment (151) along with the associated global positioning data (9) is preserved and can be saved as media file (16).

The video editor module (150) can further function to display a video segment copy icon (169) which by click event activates the video editor module (150) which functions to extract the selected video segment (151) from the video (125) along with the associated global positioning data (9). The original video (125) and global positioning data (9) remain unchanged. The video segment (151) and the corresponding global positioning data (9) can be saved as a discrete media file (16).

The video editor module (150) can further function to display a video segment insert icon (170) which by click event activates the video editor module (150) which functions to allow selection of the video segment start point (153) and the video segment end point (154). The video editor then functions to allow selection of a video segment (151) (or other video (125) or video image (15)) along with the associated global positioning data (9) and functions to insert the selected video segment (151) (125) (15) between the selected video segment start point (153) and the video segment end point (154). If the video segment start point (153) and the video segment end point (154) are selected at the same point the video editor functions to insert the selected video segment (151) (125) (15) at that point. The video editor module (150) further functions to insert the corresponding coordinate location indicators (18) into the geospatial representation (17) between the selected video segment start and end points (153) (154) in the video (125).

The video editor module (150) can further function to display a video segment splice icon (171) which by click event activates the video editor module (150) which functions to allow selection of a first video segment splice point (172) in a first video (125A) a second video splice point (173) in a second video (125B). The video editor module (150) then functions to splice the first video (12A) and the second video (125B) together at the selected first and second video splice points (172) (173) and splices the corresponding global position data streams (9) and correspondingly displays the spliced coordinate location indicators (18) in the geospatial representation (17)(as shown in the example of FIG. 8B).

Now referring primarily to FIG. 9, the geospatial media program (12) can further include an annotation editor module (174). The annotation editor module (174) functions upon execution to allow selection by click event of a coordinate location indicator (18) in the geospatial representation (17) which causes display of an annotation entry field (175) in association with the geospatial representation (17) on the display surface (77). As to particular embodiments, the annotation entry field (175) allows a user (14) to enter annotations (176). Annotations (176) include as illustrative examples: text elements (177) as a sequence of characters or symbols entered into a first annotation entry area (178). As to particular embodiments, a second annotation entry area (179) can include an associated image file selector (180) which by click event allows selection of image files (132) with image file identifiers (185). As to particular embodiments, a third annotation entry area (181) can include an associated document file selector (182) which by click event allows selection of document files (183) with document file identifiers (184) displayed in a corresponding image file field (179) and document file field (180) of the annotation entry area (171). By click event of an annotation icon (186) in the annotation entry field (175), the annotations (176) can be associated with the selected coordinate location indicator (18) and the corresponding location coordinates (107).

As to particular embodiments, annotation editor module (170) can further function to activate an optical character recognition encoder (187) which functions to encode, overlay or associate the video image (15) (video frame) corresponding to the selected coordination location indicator (18) with the annotations (172) entered by user (14) interaction into the annotation entry area (171). Annotations (172) overlaid onto a video (125) or video image (15) can include virtually any type of data, including HTML hyperlinks.

Now referring primarily to FIG. 2, the geospatial media program (12) can further include a media output module (182). The media output module (182) functions upon execution to save all the media (141) as media files (16) including all associated video stream data (7), audio stream data (8), global positioning data (9), current date and time data (49) associated with a coordinate location (28) or location coordinates (107) as a package in a compressed searchable format in the media database (78). Since global positioning data (9) and date and time data (49) are saved, the resulting media file (16) can all be searched by date, time or space as well as conventional search criteria by execution of the search module (144). The media output module (182) also allows the media file (16) to be uploaded to the Internet (17).

As can be easily understood from the foregoing, the basic concepts of the present invention may be embodied in a variety of ways. The invention involves numerous and varied embodiments of a geospatial recorder and a geospatial recording system and methods for making and using the geospatial recorder and geospatial recording system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "geospatial recorder" should be understood to encompass disclosure of the act of "geospatial recording"—whether explicitly discussed or not—and, conversely, were there effectively disclosure of the act of "geospatial recording", such a disclosure should be understood to encompass disclosure of a "geospatial recorder" and even a "means for geospatial recording." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the geospatial recorders and the geospatial recording system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A computer implemented system, comprising:
   a processor in communication with a non-transitory computer readable medium containing a video editor executable to:
   edit video stream data to associate global positioning data at intervals in said video stream data,
   depict video stream data as a video in a first display area on a display surface of a computing device;
   depict a geospatial representation surrounding said global positioning data associated with said video stream data in a second display area on said display surface of said computing device;
   depict said global positioning data associated at said intervals in said video stream data as a plurality of location coordinate indicators in said geospatial representation depicted in said second display area on said display surface of said computing device;
   define a video segment in said video, said video segment retaining association with said global positioning data;
   delete said coordinate location indicators corresponding to said video segment from said geospatial representation depicted on said display surface of said computer; and
   remove an area in said geospatial representation corresponding to said coordinate location indicators deleted from said geospatial representation depicted in said second display area on said display surface of said computer.

2. The system of claim 1, wherein said video editor further executable to implement a video segment selector on said display surface of said computing device, said video segment selector operable to select said video segment in said video.

3. The system of claim 2, wherein said video segment selector by user interaction with a first video image selection slider or a first location coordinate indicator defines a video segment start point of said video segment, and by user interaction with a second video image selection slider or a second location coordinate indicator defines a video segment end point of said video segment in said video.

4. The system of claim 3, wherein said video editor further executable to play back said video associated with said video segment between said video segment start point and said video segment end point in said first display area on said display surface of said computing device.

5. The system of claim 1, wherein said video editor further executable to:
   extract said video segment retaining said global positioning data from said video; and
   preserve in an entirety said video associated with said global positioning data.

6. The system of claim 1, wherein said video editor further executable to:
   extract said video segment retaining said global positioning data from said video; and
   delete said video associated with said video segment from said video associated with said global positioning data.

7. The system of claim 6, wherein said video editor further executable to:
   splice a pair of video stream data ends to generate a spliced video having a lesser length, said spliced video retaining association with said global positioning data.

8. The system of claim 1, wherein said video editor further executable to associate or edit metadata with each video images in said video or each corresponding coordinate location indicators in said geospatial representation.

9. The system of claim 1, further comprising a way point extractor executable to extract one video images from said video associated with said global positioning data at a way point.

10. The system of claim 9, further comprising a companion file generator executable to generate a companion file including said video image extracted from said video associated with said global positioning data at said way point.

11. The system of claim 1, wherein said video editor further executable to associate said global positioning data with one or more of a text overlay in said video stream data, a closed captioning section of said video stream data, and an audio stream.

12. The system of claim 1, wherein said video editor further executable to associate video images obtained from said video stream data with said global positioning data.

13. The system of claim 12, wherein said video editor associates said video images obtained from said video stream data with said global positioning data with one or more of said video stream, a text overlay in said video stream, a closed captioning section of said video stream, and an audio stream.

14. The system of claim 12, wherein said video editor further executable to associate location coordinates obtained from said global positioning data with said video images obtained from said video stream data.

15. The system of claim 1, further comprising an encoder executable to continuously embed said global positioning data at intervals in said video stream data.

16. The system of claim 1, further comprising:
   a global positioning system receiver executable by said processor to receive a global positioning signal from a global positioning system;
   a video receiver executable by said processor to receive a video stream from a video recorder.

* * * * *